June 1, 1937.  F. F. JOHNSON  2,082,580
BODIES FOR WITHSTANDING ALTERNATING STRESSES AND MANUFACTURE THEREOF
Filed Oct. 24, 1933    2 Sheets-Sheet 1
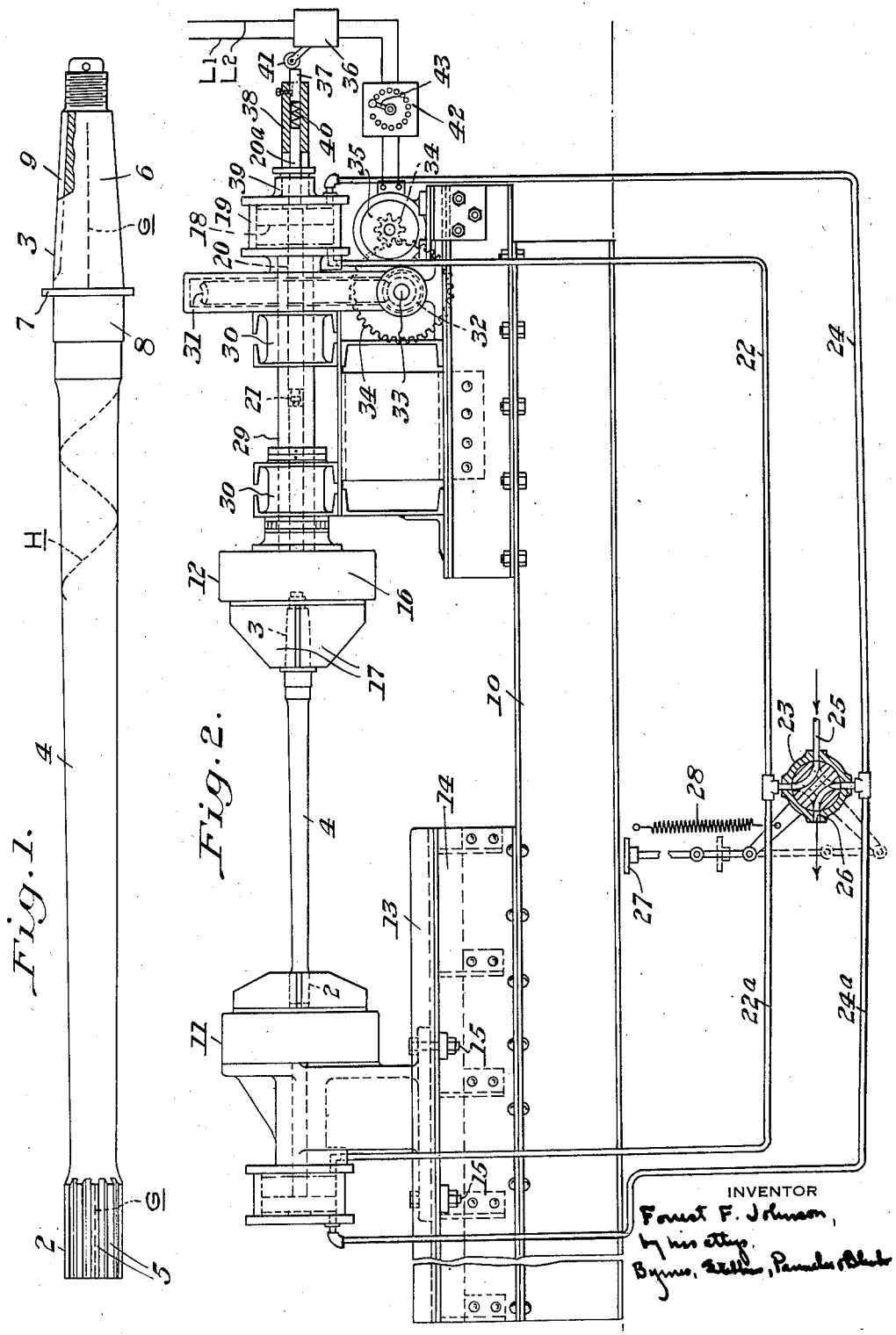
INVENTOR
Forrest F. Johnson,
by his attys.
Byrnes, Stebbins, Parmelee & Blenko June 1, 1937.     F. F. JOHNSON     2,082,580
BODIES FOR WITHSTANDING ALTERNATING STRESSES AND MANUFACTURE THEREOF
Filed Oct. 24, 1933     2 Sheets-Sheet 2
Fig. 3.
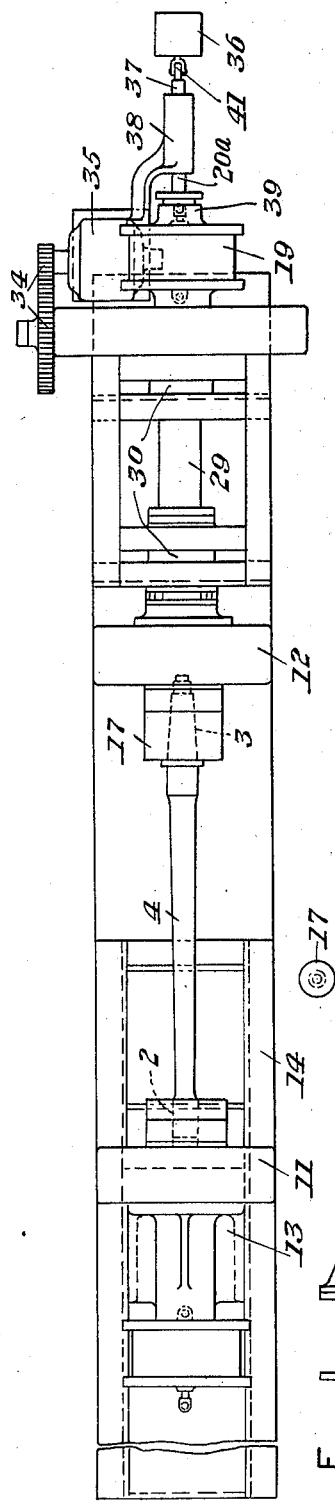
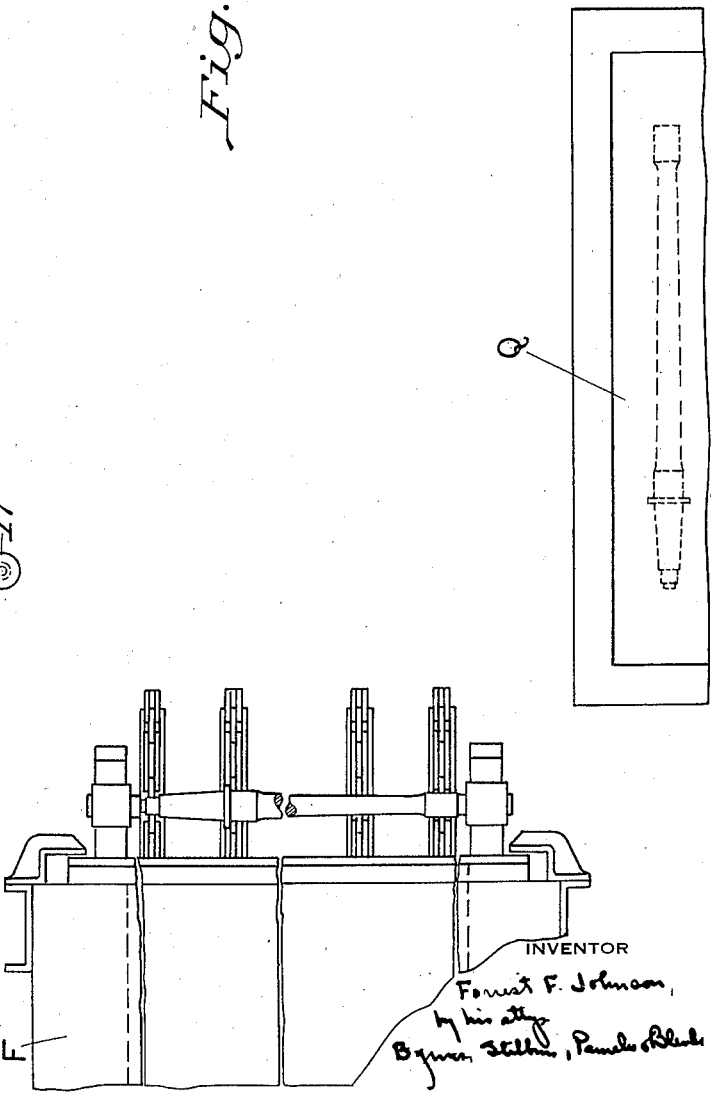
INVENTOR
Forrest F. Johnson,
by his atty Patented June 1, 1937

2,082,580

UNITED STATES PATENT OFFICE 2,082,580

BODIES FOR WITHSTANDING ALTERNATING STRESSES AND MANUFACTURE THEREOF

Forrest F. Johnson, Spencer, Ohio, assignor to The Spencer Manufacturing Company, Spencer, Ohio, a corporation of Ohio Application October 24, 1933, Serial No. 694,942

14 Claims. (Cl. 29—148)

This invention relates to bodies for withstanding alternating stresses and the manufacture thereof, and is herein particularly described as embodied in torsion shafts and the manufacture thereof. It will be understood, however, that this is by way of example only, and that the invention has other applications.

Torsion shafts, and notably rear axle shafts for automobiles, are subjected in use to alternating stresses which frequently cause fatigue failures. When an axle shaft fails from fatigue it tends to break at right angles to the bending moment; that is to say, at right angles to the shaft axis. Great care has been exercised to make sure that clean steel is employed, and that there are no local mechanical imperfections which might constitute a point of incipient fracture. A great deal of study has also been given to the design of the shafts in an effort to overcome the difficulty, but despite all of these precautions, a large number of fatigue failures continue to occur. It is estimated that at least 90 percent of automobile axle shaft failures are fatigue failures.

I have found that by a relatively simple mechanical treatment the resistance of such an article to fatigue failure may be greatly increased without impairing in any way its other physical properties. I accomplish this result by so forming the article that it has elongated grains, which grains extend at an acute angle to the direction of application of the alternating stresses which the body is required to withstand. Specifically, in the case of a torsion shaft, such as an automobile axle shaft, I twist it so as to impart a helical grain. Preferably the amount of twisting is such that in the surface portions of the shaft the helix angle is approximately 45°. This grain structure may be readily imparted by twisting the shaft preferably above the upper critical temperature.

It is not essential that all portions of the shaft be twisted. In fact, it is desirable in many cases that certain portions remain untwisted. In an automotive axle shaft, for example, one end is usually splined to engage the differential, and the wheel end is often provided with one or more keyways. I prefer that in these portions, which usually make a driving connection with the associated parts, the grain extend in the direction of the spline or keyway.

As stated, the helical grain may be readily imparted by twisting preferably at elevated temperature. I preferably employ a machine into which the heated axle may be readily inserted, gripped, and automatically twisted through the desired angle.

I have also found that entirely apart from the improvement in product as respects resistance to fatigue failure, the twisting is highly desirable in that it very effectively descales the article. Quenching is usually resorted to in the manufacture of axle shafts and the like in order to obtain the desired physical properties, and if the twisting operation above described is effected just prior to quenching, it goes into the quenching bath free of scale and this results in a more uniform hardness than is obtainable otherwise. Moreover, the twisted shafts tend to stay straighter during quenching than is the case with untwisted shafts. I attribute this not merely to the more uniform cooling occasioned by the fact that the body is free from scale, but also to the fact that local stresses which are set up are more nearly balanced out by reason of the hot working due to twisting immediately prior to the quench.

Another important advantage of my invention lies in the fact that it reduces the variation in deflection of the shafts under load. I believe this to be due in part to the improved metallurgical structure and in part due to the fact that any irregularities in cross section of the shaft are balanced out by reason of the twisting. In the manufacture of axle shafts by the usual methods such as roll forging, drop forging, or die rolling, there will always be some slight departure of the axle from true circular cross section. I have found that when such axles are placed in service they deflect under load more in one direction than in another, and in consequence high and variable alternating stresses are set up. My improved axles show only a small deflection under load, and this deflection is practically uniform regardless of the orientation of the axles.

In the accompanying drawings, illustrating a present preferred embodiment of the invention as applied to the manufacture of automotive axle shafts, Figure 1 is a side view of a representative axle shaft;

Figure 2 is a front elevation of a machine employed for carrying out my process; and Figure 3 is a top plan view of such machine with the associated furnace and quenching tank.

The axle illustrated in Figure 1 consists of a spline end 2, a wheel end 3 and an intermediate portion 4. The spline end 2 is adapted to fit into the differential of the automotive vehicle and has splines 5 cut therein. The wheel end 3 is provided with a tapered portion 6 to accommodate the wheel, a flange 7 and a cylindrical portion 8 to accommodate the shaft bearing. The portion 6 is provided with a keyway 9.

An axle, such as illustrated in Figure 1, may be made by a variety of processes; as, for example, by upset forging, roll forging, or hammer forging, or it may be die-rolled or cut from bar stock. In any case, the axle so formed is susceptible of marked improvement by my process.

During the manufacture of the axle in the case of the forging or rolling operations above mentioned, or during the bar manufacture in those cases where the axle is turned from bar stock, there is imparted to the ferrous metal from which the axle is made a grain structure consisting of relatively small elongated grains extending longitudinally of the shaft. Generally speaking, any grain will lie in or parallel to a plane containing the shaft axis. I so treat the shaft as to permanently alter the direction in which the grains extend, and, as stated, this is most readily accomplished in the case of a shaft by twisting.

Referring to Figures 2 and 3, I have illustrated equipment which may be used for carrying out the invention. The machine illustrated consists of a bed 10 having a non-rotating head 11 at one end and a rotatable head 12 at the other end. The two heads are substantially identical except insofar as provision is made for rotating the head 12, and a description of the latter will serve for both. It should be noted, however, that the head 11 is not mounted directly on the bed 10, but is secured to a base plate 13 slidable on ways 14 fastened to the bed and adjustable in different positions by bolts 15. This provision is made so that the machine may accommodate axles of different length.

Referring to the head 12, it consists of a chuck having a body 16 and a pair of clamping jaws 17 properly shaped to engage the axle to be treated. The opening and closing of the jaws is determined by a piston 18 in an air cylinder 19. This type of clutch and operating mechanism is well known and requires no detailed description. The air cylinder 19 is stationary and the rod 20 of the piston 18 is jointed at 21 so that the portion which is connected to and rotates with the head 12 can rotate relative to that portion of the rod connected to the piston, yet will move in and out as the piston moves.

One end of the cylinder 19 is connected through a pipe 22 to a four-way valve 23 and the other end of the cylinder is connected to such valve by a pipe 24. Air under pressure is supplied to the valve through a pipe 25 and exhaust air may pass off through a port 26. The valve is actuated by the operator through a foot treadle 27 against a spring 28 normally tending to hold the valve in the position shown. In this position air under pressure passes from the pipe 25 through the valve 23 to the pipe 22 so as to urge the piston 18 to the right as viewed in Figure 2, thus holding the chuck jaw closed. At the same time the pipe 24 is connected through the valve 23 to the exhaust port 26. When the foot treadle 27 is depressed so as to move the valve to the dotted line position, air passes from the supply pipe 25 through the pipe 24 to the right-hand end of the cylinder 19, thereby moving the piston 18 to the left and causing the chuck jaw to open. Branch pipes 22a and 24a lead to the corresponding cylinder on the head 11 so that both chucks are simultaneously operated.

Figure 3 shows a furnace F which is diagrammatically illustrated as being of the continuous type. In practice an operator standing in front of the machine will grasp a heated axle shaft with a pair of tongs, place it between the open jaws of the twisting machine, clamp it in the machine by actuating the foot treadle 27, and then after the twisting has been effected, remove the twisted axle from the machine and drop it into a quenching tank Q. The machine is designed to automatically start when the axle shaft has been gripped, and to stop after a predetermined amount of twisting has been accomplished. The head 12 is mounted on a shaft 29 mounted in bearings 30 and carrying a worm wheel 31. The worm wheel meshes with a worm 32 on a shaft 33. The shaft 33 is connected through gearing 34 to an electric motor 35. The electric motor is supplied with current from line wires L1 and L2 having a switch 36 interposed therein. The switch is actuated by a plunger 37 moving in a fixed guide 38 which is coaxial with the shaft 29. The shaft 20 of the piston 18 is extended through a packing gland 39 at the end of the cylinder 19, as indicated at 20a, the protruding end of the shaft extending into the guide 38. A spring 40 is interposed between the shaft 28 and the plunger 37. When the piston 18 is moved to the right to close the clutch jaws and grip the axle shaft in the twisting machine, the shaft 20a, acting through the spring 40, forces the plunger 37 to the right, as viewed in Figure 2, against the operating arm 41 of the switch 36, thereby closing the contact and starting the motor 35.

A time relay 42 is interposed in the line between the switch 36 and the motor 35. It has an adjusting arm 43 whereby the motor will run for a given adjusted time interval and then come to rest. Time relays of this character are well known and require no extended description. The motor 35 will preferably be of the synchronous type so that the effect of the time relay 42 is to cause it to rotate for a desired number of revolutions, as determined by the setting of the handle 43, and then come to rest. In this fashion the amount of twisting of the shaft may be readily fixed.

As soon as the twisting has been effected the operator moves the foot treadle 27 so as to open the jaws. When this occurs the shaft 20a moves to the left and a spring, not shown, in the switch 36 causes the switch arm 41, now relieved of the pressure of the plunger 37, to move so as to open the circuit. The spring 40 is interposed to take up any excess motion of the shaft 20a over and above the limits of movement of the switch arm 41. It will be understood that the amount of movement of the shaft 20a will vary depending on the diameter of the axle being gripped.

Again referring to Figure 1, I have indicated by a dotted line H the helical direction which the grains assume when the axle shaft is twisted. The line H indicates the helix for the grains at the surface and it will be noted that the helix angle is approximately 45°. I have found that for torsion shafts this is substantially the best angle of twist to employ. It will, of course, be appreciated that the amount of twisting required to impart the desired helix angle will depend on the diameter of the shaft and the distance between grips, but all of this may be readily taken care of by suitable adjustment of the time relay 42.

It will be noted from Figure 2 that the grips for the head 11 engage the spline end 2 of the axle shaft in its entirety and that the grips for the head 12 engage the wheel taper 6 of the shaft. Because of this manner of gripping the grains in the end portions do not extend helically but axially, as indicated by dotted lines G. Consequently, the splines 5 and the keyway 9 do not cut across grains and this is desirable from the standpoint of eliminating sources of incipient fracture in the end portions.

The amount of twisting which is effected in carrying out my invention does not appreciably shorten the axle shaft, especially if, as I prefer, the twisting is accomplished at above the upper critical temperature. It is therefore unnecessary to make any provision for the heads 11 and 12 moving toward one another during the twisting operation.

I have illustrated and described a present preferred way of practicing my invention as applied to the manufacture of axle shafts. It will be understood, however, that this is by way of example only and that the invention may be otherwise embodied or practiced within the scope of the following claims.

I claim:

1. As a new manufacture, a torsion shaft made of wrought ferrous metal, the shaft having a recessed portion and an unrecessed portion, the shaft being made of wrought ferrous metal having elongated grains, the grains in the unrecessed portion being helically disposed, the grains in the recessed portion extending at an angle to the direction of the helically disposed grains and following the general direction of the recess.

2. As a new manufacture, a torsion shaft comprising an integral unitary metal body having elongated grains, the grains extending at an angle to the longitudinal axis of the shaft and being permanently and normally so aligned and of the character obtained by twisting the shaft about its axis while above the critical temperature of the metal.

3. As a new manufacture, a torsion shaft comprising an integral unitary metal body having elongated grains, of the character obtained by twisting the shaft about its axis while above the critical temperature of the metal, the shaft having a permanent twist therein.

4. As a new manufacture, a torsion shaft comprising an integral unitary metal body having elongated grains, the shaft having a permanent twist in a portion thereof, an end portion being untwisted.

5. As a new manufacture, a torsion shaft comprising an integral unitary metal body having elongated grains, the shaft having a permanent twist therein, the grains in a surface portion of the shaft extending at a helix angle of approximately 45°.

6. As a new manufacture, a torsion shaft comprising an integral unitary metal body having portions adapted for the attachment of driving and driven members, the shaft having a permanent twist therein between such portions.

7. As a new manufacture, a torsion shaft comprising an integral unitary metal body having end portions adapted for the attachment of driving and driven members and having an intermediate portion, the metal having elongated grains, the grains in the end portions extending in the generally axial direction of the shaft, the grains in the intermediate portion being helically disposed.

8. In the manufacture of torsion resistant articles, the steps consisting in forming a ferrous body which is to constitute the article, raising it to a temperature above the critical point of the metal from which the body is formed, and twisting the body so as to permanently alter the direction in which the grains extend.

9. In the manufacture of torsion resistant articles, the steps consisting in forming a ferrous body which is to constitute the article, raising it to a temperature above the critical point of the metal from which the body is formed, and twisting the body so as to direct the grains helically.

10. In the manufacture of torsion resistant articles, the steps consisting in forming a ferrous body which is to constitute the article, raising it to a temperature above the critical point of the metal from which the body is formed, and twisting the body so as to permanently alter the direction in which the grains extend, and quenching the body.

11. As a new manufacture, a torsion shaft comprising an integral unitary metal body having elongated grains, the shaft having a permanent twist therein throughout a portion of its length, the grains in said portion extending at an angle to the longitudinal axis of the shaft, the direction of the grained structure in the remaining portion of the shaft remaining substantially undisturbed.

12. As a new manufacture, a torsion shaft comprising an integral unitary metal body having elongated grains, the grains extending at an angle to the longitudinal axis of the shaft and being of the character obtained when the shaft is twisted about its axis at a temperature above the critical temperature.

13. As a new manufacture, a torsion shaft comprising an integral unitary metal body having elongated grains, the grains extending at an angle to the longitudinal axis of the shaft and being of the character obtained when the shaft is twisted about its axis at a temperature above the critical temperature, and quenched.

14. As a new manufacture, a torsion shaft comprising a unitary metal body having elongated grains, the grains in a surface portion of the shaft extending at an angle to the axis of the shaft and being of the character obtained by twisting the shaft about the axis of the grains above the critical temperature of the metal.

FORREST F. JOHNSON.